United States Patent [19]

Alliston et al.

[11] 3,896,041
[45] July 22, 1975

[54] METHOD AND SYSTEM OF SIMULATING NUCLEAR POWER PLANT COUNT RATE FOR TRAINING PURPOSES

[75] Inventors: William H. Alliston; Rainer H. Koenig, both of Murrysville, Pa.

[73] Assignee: Westinghouse Electric Corporation, Pittsburgh, Pa.

[22] Filed: Mar. 14, 1973

[21] Appl. No.: 341,193

[52] U.S. Cl. ............... 235/151.21; 35/13; 176/19; 444/1
[51] Int. Cl. .......................................... G09b 9/00
[58] Field of Search ... 444/1; 235/184, 151, 151.21; 176/19, 24; 35/10, 13, 10.2

[56] References Cited
UNITED STATES PATENTS
3,061,945  1/1962  Hawkins ............................. 35/10
3,237,318  3/1966  Schager ............................. 35/10

OTHER PUBLICATIONS
Reactor Simulator Utilizing a Vacuum, Harry Reese, Jr., RCA Technical Notes, RCA TN No.: 493, Sept. 1961.
Dynamic Simulation of a Fast Reactor, R. G. Olson, Nucleonics, May, 1957, pp. 76–79.
An Electronic Reactor Simulator, Ross Cameron & D. A. Austio, Nuclear Power, April, 1957, pp. 146–151.
PWR Training Simulator, J. P. Franz & W. H. Alliston, Nucleonics, May, 1957, pp. 80–83.

*Primary Examiner*—Malcolm A. Morrison
*Assistant Examiner*—Edward J. Wise
*Attorney, Agent, or Firm*—H. W. Patterson

[57] ABSTRACT

A method and system for the real-time simulation of the dynamic operation of a nuclear power plant in which nuclear flux rate counters are provided for monitoring the rate of nuclear fission of the reactor, utilizes apparatus that includes digital computer means for calculating data relating to the rate of nuclear fission of a simulated reactor model, which rate is controlled in accordance with the operation of control panel devices. A digital number from the computer corresponding to the flux rate controls an oscillator driven counter means to produce a pulse after a predetermined count. This pulse controls an oscillator driven polynomial counter to count a random number that controls a third counter in accordance with pulse from the first counter to produce a random fission count for operating the meters.

11 Claims, 9 Drawing Figures

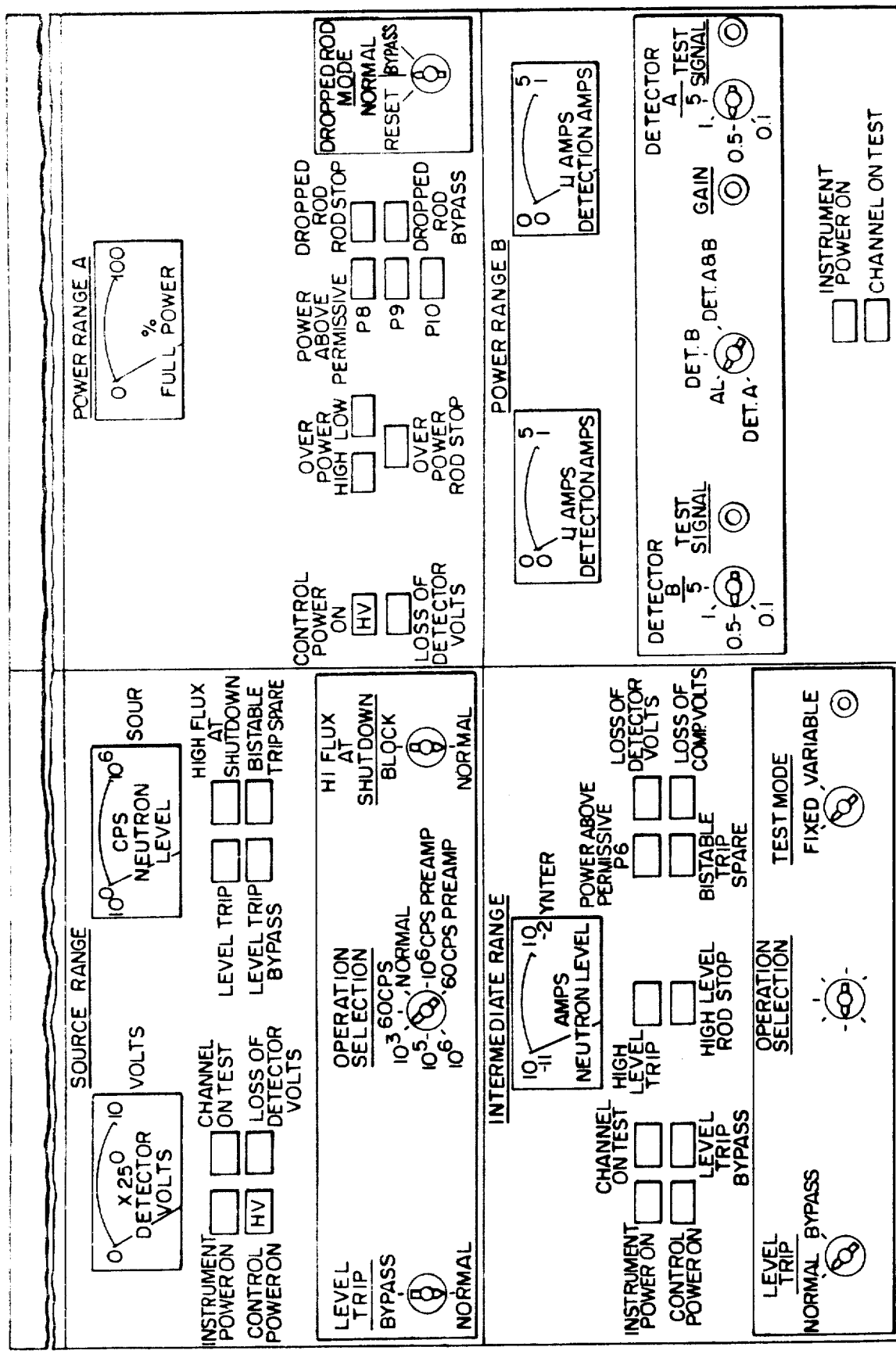
FIG. 9O/2A

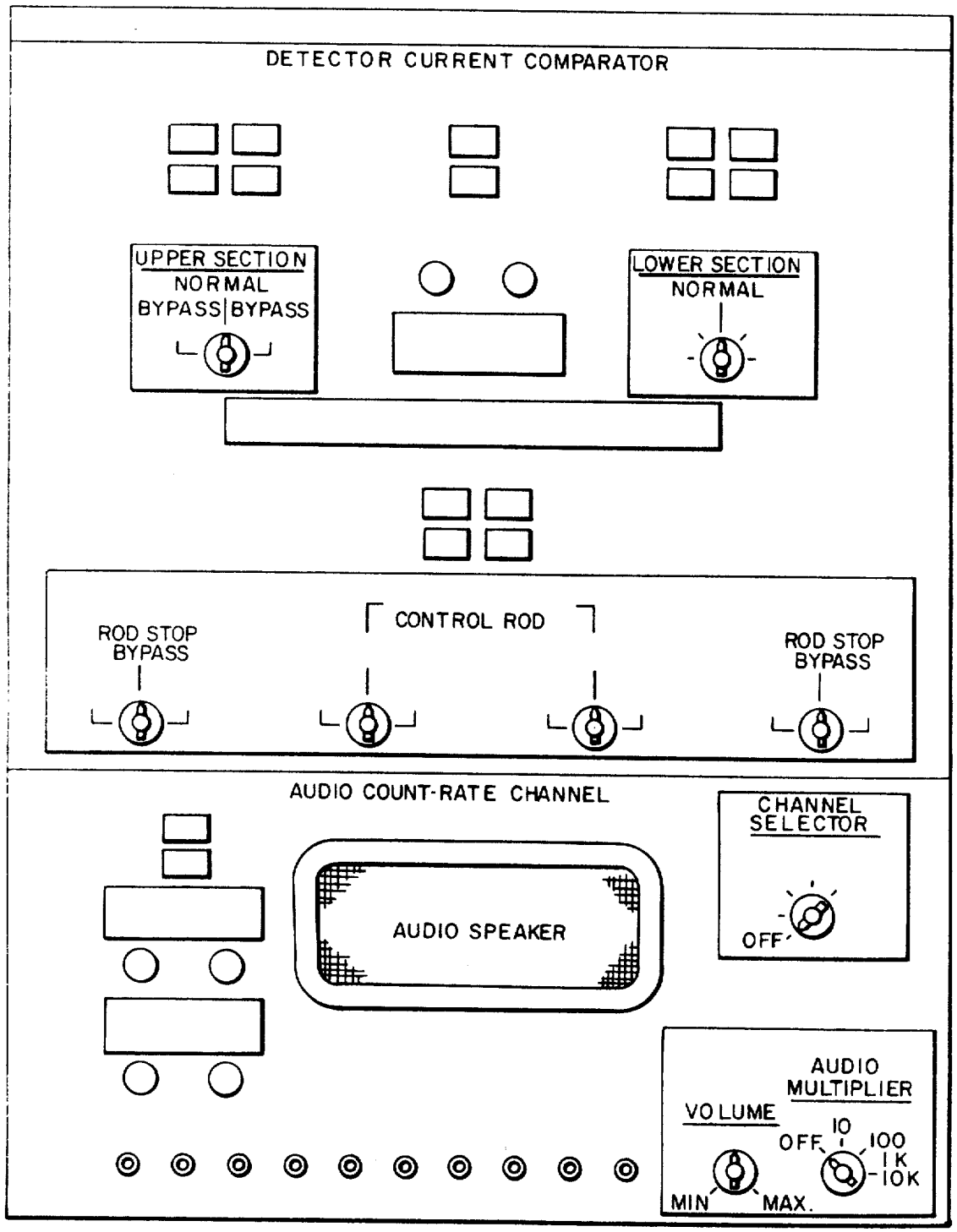
FIG. 90/2B

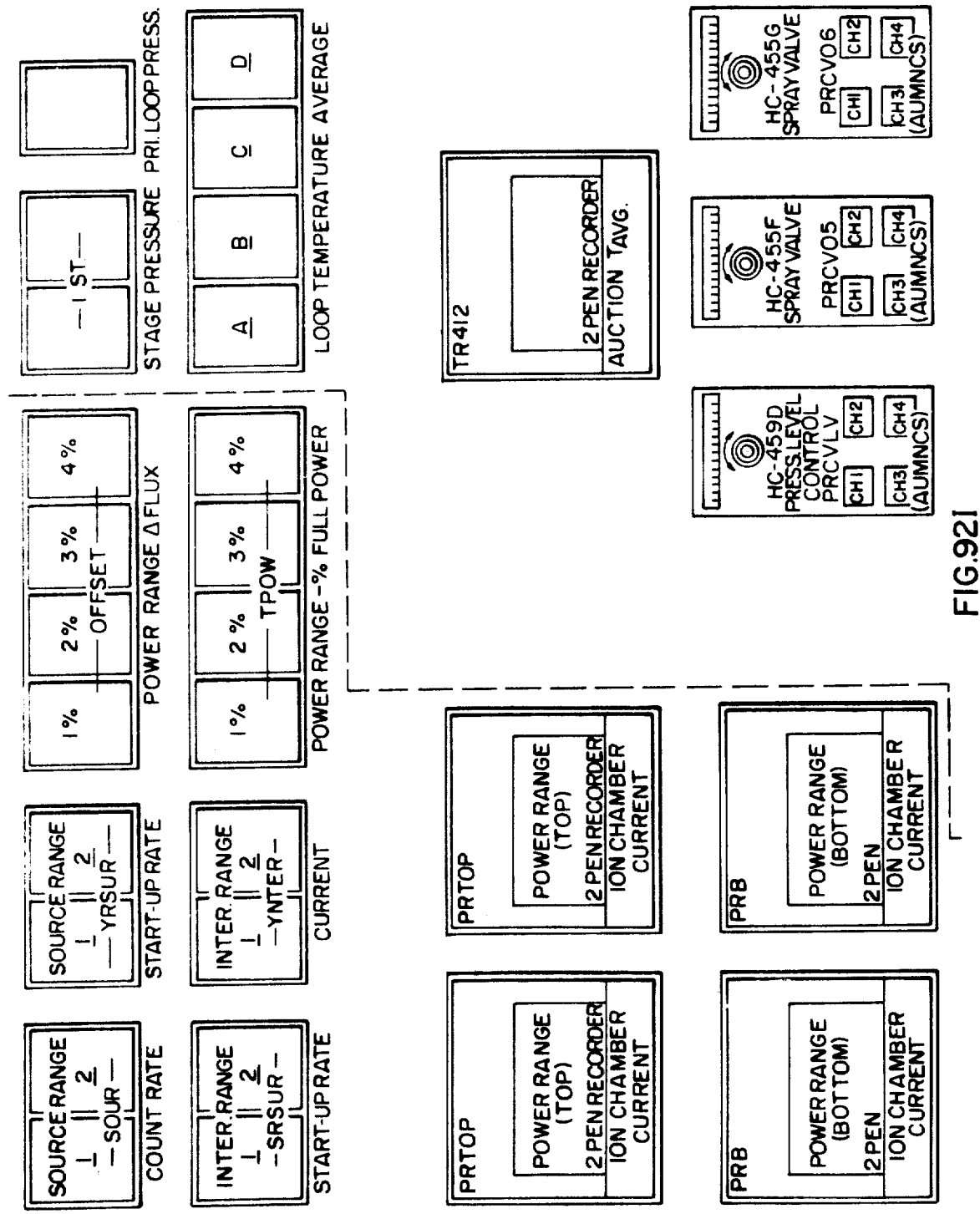
FIG.9.2I

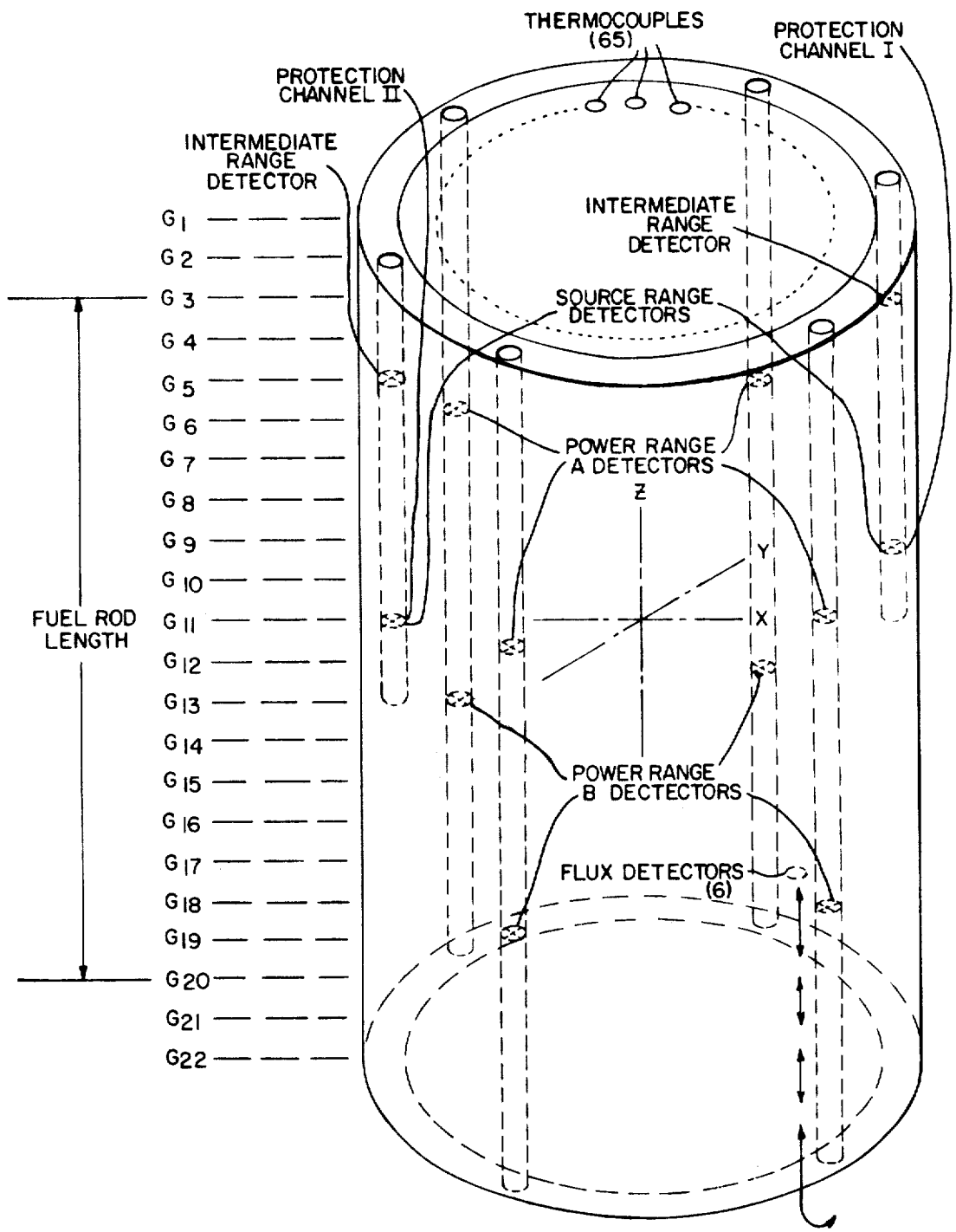
FIG.96/2

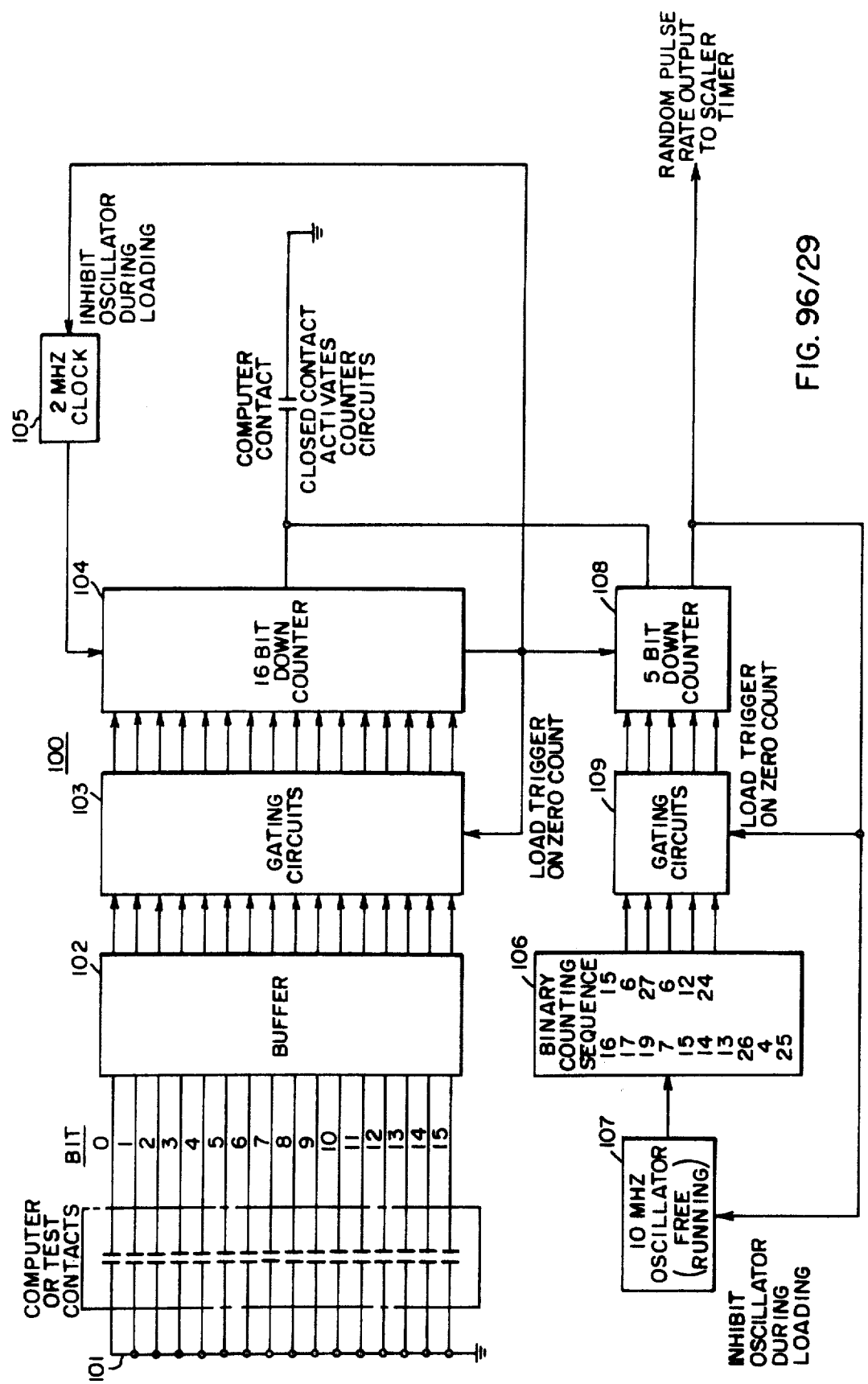
FIG. 96/29

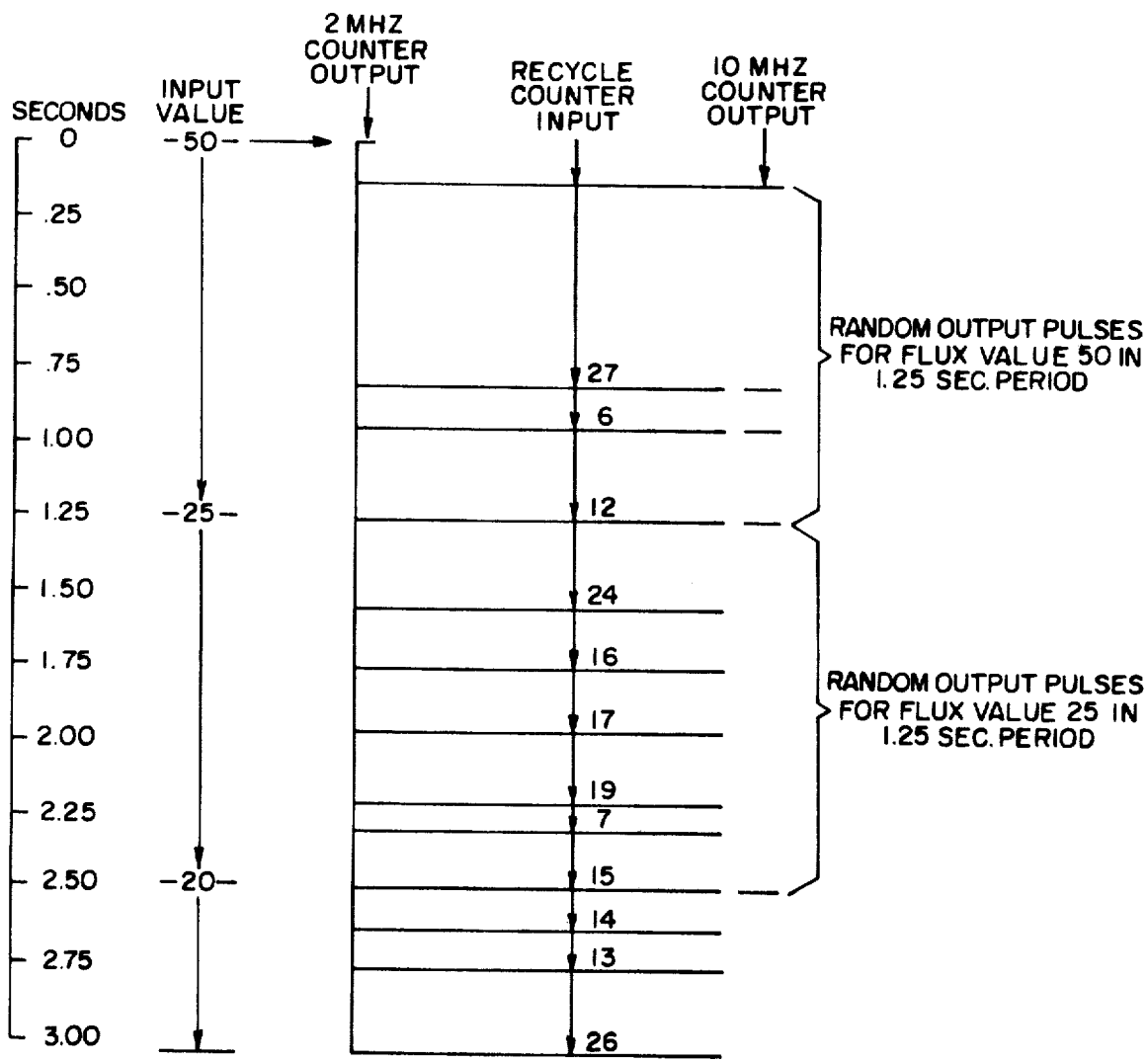
FIG. 96/30

METHOD AND SYSTEM OF SIMULATING NUCLEAR POWER PLANT COUNT RATE FOR TRAINING PURPOSES

CROSS REFERENCE TO RELATED APPLICATIONS

Reference is made to the following concurrently filed and related patent applications which are assigned to the present assignee:

1. Ser. No. 333,901 entitled "Training Simulator For A Nuclear Power Plant" and filed by G. L. Gregg, R. E. Putman and J. W. Gomola on Feb. 23, 1973.

2. Ser. No. 335,236 entitled "Nuclear Power Plant Training Simulator System And Method" and filed by R. W. Ferguson and R. E. Converse on Feb. 23, 1973.

3. Ser. No. 335,295 entitled "Nuclear Power Plant Training Simulator Modeling Organization And Method" and filed by W. H. Alliston on Feb. 23, 1973.

4. Ser. No. 335,181 entitled "Training Simulator For Nuclear Power Plant Reactor Monitoring" and filed by W. H. Alliston, F. R. Czerniejewski and B. A. Mutafelija on Feb. 23, 1973.

5. Ser. No. 335,288 entitled "Training Simulator For Nuclear Power Plant Reactor Control Model And Method" and filed by F. R. Czerniejewski on Feb. 23, 1973.

6. Ser. No. 335,294 entitled "Training Simulator For Nuclear Power Plant Reactor Coolant System And Method" and filed by W. H. Alliston and A. A. Desalu on Feb. 23, 1973.

7. Ser. No. 335,285 entitled "Engineered Safeguards Systems And Method In Nuclear Power Plant Training Simulator" and filed by A. A. Desalu on Feb. 23, 1973.

8. Ser. No. 335,391 entitled "Fluid Distribution Network And Steam Generators And Method For Nuclear Power Plant Training Simulator" and filed by W. H. Alliston, S. J. Johnson and B. A. Mutafelija on Feb. 23, 1973.

9. Ser. No. 335,183 entitled "Training Simulator And Method For Nuclear Power Plant Heater And Non-Linear Modeling" and filed by B. A. Mutafelija on Feb. 23, 1973.

10. Ser. No. 335,293 entitled "Secondary System Modeling And Method For A Nuclear Power Plant Training Simulator" and filed by S. J. Johnson on Feb. 23, 1973.

11. Ser. No. 335,184 entitled "Data Communication And Method For Real-Time Plural Computer Configuration" and filed by F. G. Willard, N. Slavin and L. S. Schmitz on Feb. 23, 1973.

12. Ser. No. 335,287 entitled "System And Method For Xenon Acceleration In Training Simulator For Nuclear Power Plant" and filed by F. R. Czerniejewski Feb. 23, 1973.

13. Ser. No. 341,181 entitled "Method And System For Nuclear Power Plant Synchroscope Simulation For Operator Training" and filed by W. H. Alliston and S. J. Johnson Mar. 14, 1973.

BACKGROUND OF THE INVENTION

The present invention relates to the full-scope real-time simulation of the dynamic operation of a nuclear powered electrical generating plant for training plant operators.

The increasing demand for well trained power plant operators together with the complexity of modern day power plants, has led to the realization that the simulator is the most effective tool for such training.

Also, with advancements in nuclear power plant technology, experienced operators from time-to-time need retraining in order to be competent. An actual nuclear plant cannot provide the operator with the required experience, such as starting up, changing load, and shutting down, for example, except after years of experience; and even then, it is unlikely that he would observe the effect of important malfunctions and be able to take the best corrective procedures.

Although simulators have been used for many years, in power plant design, it is only recently that they have been used for power plant operator training. An article in the July 22, 1968 issue of "Electrical World," entitled "Nuclear Training Center Using Digital Simulation" briefly describes the installation of a boiling water reactor plant simulator. An article in the same publication in the Oct. 6, 1969 issue entitled "Huge Simulator to Ready More Reactor Operators" discusses the proposed installation of a pressurized water reactor simulator. In Volume 10, No. 5 of the publication "Nuclear Safety" published during September and October, 1969 is an article entitled "Training Nuclear Power Plant Operators With Computerized Simulators;" and in the June, 1972 issue of the publication "Power Engineering" there is an article entitled "Simulators" which describes a number of power plant operator training simulators presently in use or proposed.

Design simulators usually cover only a small part of the process, and may run slower or faster than realtime; while training simulators must operate and respond in a manner identical to the actual plant. A design simulator may involve only a narrow range of conditions, while a training simulator must simulate from "cold" shutdown to well beyond normal operating conditions. A design simulator usually involves only the major process, while a training simulator should cover every auxiliary system with which the plant is concerned.

Further, the full-scope simulation of a nuclear power plant for operator training is of such extensive scope that it is advantageous to provide as many modeling simplifications as possible within the limits of steady-state and transient accuracy. The mathematical modeling of a nuclear power plant is concerned with material, energy and volume balances, which often result in mathematical variables such as temperature, pressure, material flows and flow rates, concentration of materials, specific volumes and enthalpies, mechanical speeds, vibrations, electrical current, voltage and frequency, etc.

Training simulators presently in use for operator training, which are more or less complete in their simulation utilize a digital computer that is connected to control consoles that are identical in operation and appearance to the plant being simulated. Also, an instructor's console is connected to control the simulator, introduce malfunctions, initialize the simulated plant at selected states of operation, and perform other functions useful for training purposes and control of the simulator. These computers have been of the same type used for aircraft training in some instances and process control in others.

The reactor portion of the power plant must be controlled and monitored with extreme accuracy. Thus, in an actual plant, meters are provided to inform the operator visually and audibly of the rate of nuclear fission of the nuclear reactor. The visual meters inform the operator of the rate of nuclear fission for a predetermined time period, and the audible indicator produces a click representative of nuclear fission. The audible indicator in an actual plant produce an output click that can vary from less than one per second to over thousands of clicks per second. These clicks or counts per second are random in nature throughout their entire range, but such randomness is evident to the operator in the lower ranges.

In simulating the operation of the nuclear flux rate meters, it is necessary that the count is variable over a wide range; that is, from less than one count per second to over thousands of counts per second. Also, it is desirable that such count rate for the audible meter be random to provide accurate realism for the trainee.

SUMMARY OF THE INVENTION

According to the broad principles of the present invention, a method and system for the real-time simulation for training purposes of the dynamic operation of a nuclear power plant including a nuclear flux rate meter utilizes apparatus wherein a control console with a plurality of manually operable devices provide input data and respond to simulated physical values provide output data for monitoring the plant operation. A computer calculates physical values related to nuclear flux rate in accordance with the input data to provide output data for operating a flux rate meter. In a more specific aspect, simulation of the flux is characterized by counting means that responds to a digital value to produce an output pulse after a predetermined number of counts. These counts are used for counting a number of pulses which numbers are determined by another oscillator driven counter to drive the meters at a random variable rate.

BRIEF DESCRIPTION OF THE DRAWINGS

FIGS. 90/2A and 90/2B illustrates a front view of a portion of the nuclear instrumentation panel for controlling and indicating the ex-core flux detection and monitoring system, and the audio count rate output;

FIGS. 92I and 92G illustrate a portion of the front view of the reactor coolant system portion of the control panels of the simulator;

FIG. 96/2 is a schematic diagram of a typical reactor core of the type being simulated in accordance with the present invention;

FIG. 96/29 is a block diagram of the circuitry utilized in simulating the random pulse output for the audio count rate simulation;

FIG. 96/30 is a timing graph to illustrate the random output pulse rate for the audio count rate meter.

GENERAL DESCRIPTION OF SIMULATED NUCLEAR POWER PLANT

Figure 1:
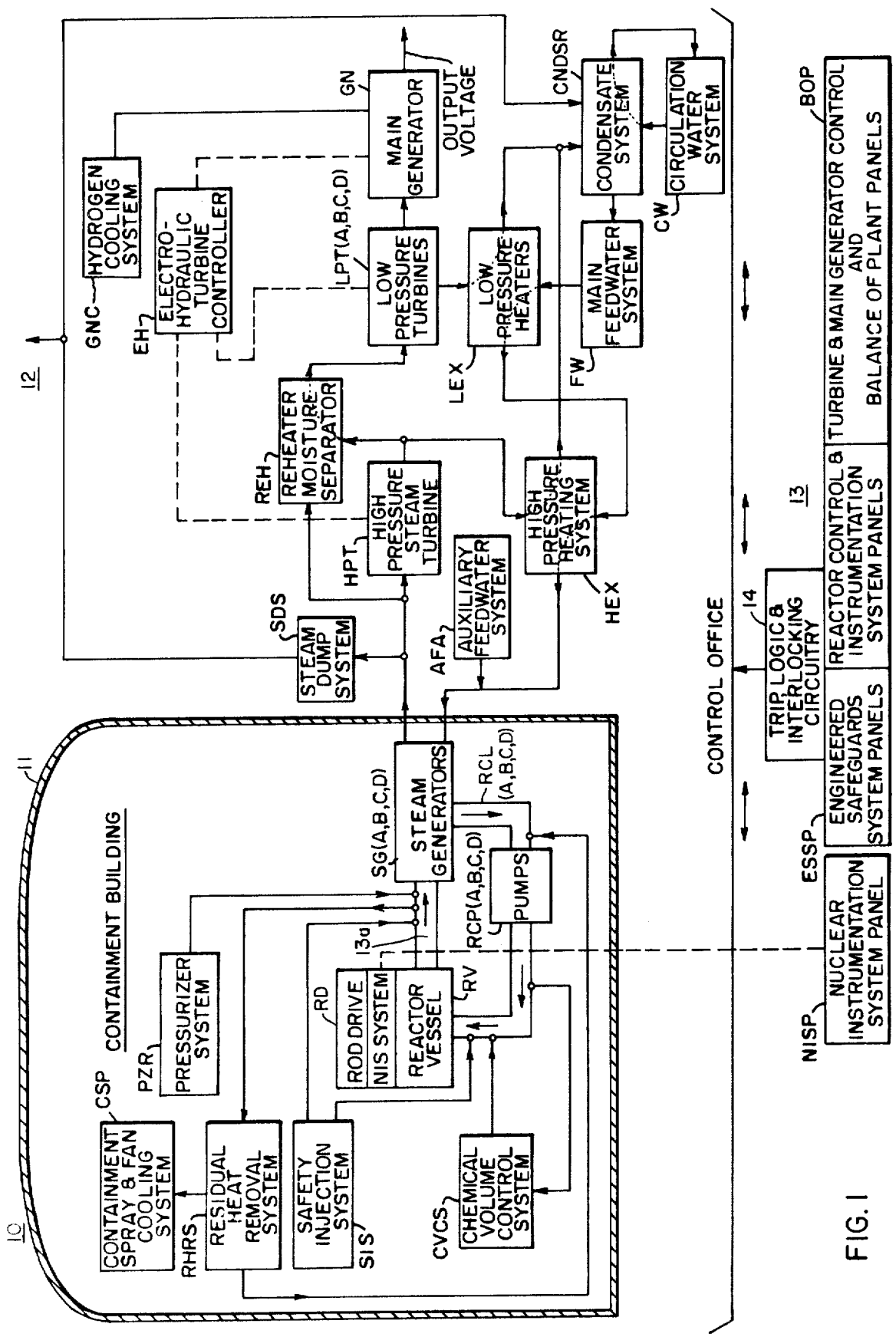
FIG. 1 shows a schematic block diagram of a nuclear powered electrical generating plant that is simulated in accordance with the present invention.

Referring to FIG. 1, the preferred embodiment of the invention is described in connection with the simulation of a nuclear power plant, in this case a four loop pressurized water reactor power plant. Such a plant includes a primary system generally referred to as 10 which is housed in a containment building 11, a secondary system, generally referred to as 12, and a control office that includes control and indication panels 13 for operating and monitoring the various elements in the power station. The plant itself is described herein in a general sense to an extent which will aid in understanding the invention. More detail on the plant is ascertainable from the more detailed invention description herein. Extensive background information on nuclear plants of various kinds is widely available in prior patents and publications. Certain invention features are applicable to nuclear plant types other than the pressurized water type.

The primary system includes a nuclear reactor housed in a reactor vessel RV and in this instance four closed reactor coolant loops RCL (A, B, C, and D), connected in parallel to reactor vessel RV. Each loop contains a reactor coolant pump RCP (A, B, C, and D) and a steam generator SG (A, B, C, and D). The reactor vessel RV, reactor coolant loop piping RCL, pumps RCP, and primary side of steam generators SG, all form what is referred to as a reactor coolant system RCS. The primary system 10 also includes an electrically heated pressurizer system PZR and certain auxiliary systems hereinafter described.

High pressure water circulates through the reactor vessel RV to remove the heat generated by a nuclear chain reaction within a fuel arrangement disposed in the reactor. This heated water exits from the reactor vessel RV and passes via the coolant loop piping RCL to the steam generators SG. In the steam generators SG, the coolant water gives up its heat to the feedwater in the secondary side of the steam generator SG to generate steam for a turbine driven electrical generator GN. The reactor coolant cycle is completed when the coolant is pumped back to the reactor vessel RV for reheating in the nuclear reactor.

Rod drive system RD is used to control reactor power level and consists of clusters or banks of movable cylindrical neutron absorber rods. The absorber rods move within guide tubes in certain fuel assemblies in the reactor fuel arrangement. The reactor coolant pumps RCP are vertical single stage mix flow pumps of the shaft seal type; and are designed so that adequate coolant flow is maintained to cool the reactor core adequately under all conceivable circumstances. The steam generators SG are vertical U-tube units that contain integrally therewith, in the secondary side, moisture separation equipment that reduces the moisture content of the steam to one-quarter percent or less. The electrically heated pressurizer PZR connected to one of the four reactor coolant loops RCL maintains the reactor coolant system RCS pressure during normal operation, limits the system coolant pressure variation during plant load transients, and keeps the system coolant pressure within design limits during abnormal conditions.

The reactor operating level is controlled inherently by a negative temperature coefficient of reactivity of the water; by control rod cluster positioning as already indicated; and by a soluble neutron absorber, such as boron in the form of boric acid. The boric acid is inserted into the coolant during cold shutdown, partially removed during startup, and adjusted in concentration during the life time of the fuel in the core to compensate for such effects as fuel consumption, and accumulation of fission products, which tend to slow the nuclear chain reaction.

The primary system includes engineered safeguard systems, ESS including chemical and volume control system CVCS, safety injection system SIS, residual heat removal system RHRS, containment spray and fan cooling system CSP, and an accumulator discharge system (not shown) which is described in detail in connection with the description of the individual models.

The chemical and volume control system CVCS performs a number of functions, such as filling the reactor coolant system RCS, providing a source of high pressure water for pressurizing the system RCS when cold, maintaining the water level in the pressurizer system PZR when the RCS system is hot, reducing the concentration of corrosion and fission products in the reactor coolant, adjusting the boric acid concentration of the reactor coolant, and providing high pressure seal water for the seals of the reactor coolant pumps RCP.

The residual heat removal system RHRS portion of the engineered safeguard systems ESS transfers heat energy from the reactor core and the system RCS during plant shutdown and refueling operations. Components in the residual heat removal system RHRS are also employed in conjunction with the safety injection system SIS.

The safety injection system SIS supplies borated water to the system RCS to limit the fuel rod cladding temperature in the unlikely event of a loss of coolant accident. Also, the system SIS functions to provide a means of introducing a spray of borated water into the containment 11 as an additional dynamic heat sink. The system SIS includes several independent subsystems characterized by equipment and flow path redundancy. This redundancy assures complete reliability of operation, and continued core cooling even in the event of a failure of any single component to respond actively as intended. For example, during the passive accumulator injection phase of the system operation which is described in connection with the individual models, accumulator tanks rapidly inject borated water into the reactor coolant system automatically when the depressurization of loops RCL causes a reversal of the pressure drop across the accumulator check valves. The accumulators provide rapid cooling of the reactor core for large breaks which would otherwise result in core uncovering and overheating before the electrically driven low head safety pumps of the SIS system are energized and delivering coolant. The low head system of safety injection provides for injection of borated water into the RCL loops for large breaks, which would result in rapid blowdown and depressurization. A high head system for injection into the loops RCL for small breaks is provided for those instances that would result in slow blowdown and depressurization. The low head system utilizes pumps of the residual heat removal system RHRS which takes water from a refueling water storage tank, and pumps borated water through one of the residual heat exchangers, through an injection header and injection lines to each of the reactor coolant loops. The high head safety injection phase utilizes two subsystems which provide extremely rapid response to an SIS system actuation signal, utilizing a boron injection tank and a charging pump of the chemical and volume control system CVCS.

The containment building 11 completely encloses the entire primary system and insures that an acceptable upper limit for leakage of radioactive materials to the environment is not exceeded, even if gross failure of the elements contained therein were to occur. The containment spray system CSP is included in the primary system to limit the pressure in the containment atmosphere to below the containment design pressure, and remove sufficient iodine from the containment atmosphere to limit the radiation doses to safe value. This system delivers NaOH to the space within the containment building 11. The reactor containment fan cooling system portion of CSP which is also part of the containment building monitoring system removes heat from the containment building during normal operation, and during any loss of coolant accident. When a loss of coolant accident is sensed, the fan motors are automatically switched to low speed to provide circulation of the steam-air mixture in the containment building.

The steam generators SG (A, B, C, and D) deliver steam at appropriate pressure and temperature in the secondary system for conversion to mechanical and then to electrical energy in the turbines and the generators, respectively. The secondary steam is additionally used for various operational auxiliary services such as turbine shaft steam seals, turbine drives for main and auxiliary feedwater pumps and steam jet air ejectors.

Steam is admitted to a double flow high pressure turbine HPT that is controlled by governor valves with quick acting throttle or stop valves ahead of them for rapid isolation in an emergency. Four separate pipes convey steam from the governor valves to the turbine nozzle chambers. The steam passes through an impulse blading or control stage and a number of reaction stages of the high pressure turbine HPT; the impulse chamber steam pressure is measured and used as a load measurement for use in reactor control.

On leaving the last row of high pressure blades, the steam has a moisture content of approximately 10 percent. Thus, the steam is then passed through a moisture separator and reheater REH to improve the turbine efficiency and reduce the low pressure turbine exhaust moisture. The exhaust steam from the high pressure turbine when first passed through the moisture separator portion REH removes approximately 10 percent of the flow which is extracted as moisture. The remaining 90 percent flows through steam heated reheater portion of REH where it receives approximately 100°F superheat. The moisture is removed and drained to a heater drain tank (not shown); and the steam which rises above the moisture separator passes over the reheater and is reheated by live steam.

The hot reheated steam is conveyed to the double flow low pressure turbines LPT (A, B, C) the number of which in use can depend on the electrical output required. The low pressure turbine exhaust directs the steam to a condenser CNDSR that has cooling water passing through tubes which condense the steam to water where it is collected in a chamber, called a hot well. The condenser cooling water is controlled by circulating water system CW. The condensate system CNDSR and the feedwater system FW return the condensed steam from the turbine condenser, and the drains of the regenerative feed heating cycle, to the steam generators SG (A, B, C, and D) while maintaining the proper water inventories throughout the cycle.

The feedwater system FW conveys the feedwater through low pressure heaters LEX and then through high pressure heaters HEX to the generators SG. The auxiliary feedwater system AFA is used when the main system is inoperative. These systems automatically maintain the water level of the steam generators SG during both steady-state and transient operation.

The turbine HPT is equipped with an electrohydraulic control system EH comprising a solid state electronic controller and a high pressure fluid supply. The electronic controller computes a control signal based on measured turbine speed, measured first stage steam pressure, and speed and loss reference values established by the dispatcher or initiated at the operator's control panel 13. The control signal is transmitted to the electrohydraulic actuator of each main steam throttle and/or governoring valve to produce the valve positioning needed to meet the reference load. During turbine startup, the throttle valves are position controlled to accelerate the turbine from turning gear or higher speed up to synchronous speed. The high pressure hydraulic fluid system provides the power for all turbine steam control valves, electrohydraulic actuators, and positions the governor valves in response to the electric control signals from the electronic controller. The interceptor valves are also operated by the hydraulic fluid, and they may be position controlled or simply controlled to be either open or closed.

The electrohydraulic control system provides turbine control during all phases of operation by varying the turbine valve openings. Hydraulic cylinders move the valves to the required opening with electrically operated servo-valves controlling the cylinder's position.

The main generator GN operated by the turbine is a hydrogen inner cooled synchronous generator with a water cooled stator and an output voltage of approximately 22 to 25 kV at 60 cycles. The excitation is provided by a shaft driven air cooled brushless exciter. Cooling for the generator is provided by system GNC which circulates hydrogen at a pressure of about 75 psig through the generator GN by fans attached to the generator shaft.

Various plant parameters including reactor parameters, coolant and steam pressures, temperature, and flows and liquid levels in the various systems, as well as the speed of the turbines and electrical output of the generator are sensed and displayed through meters, alarms, and annunciators on the central office panel 13. Among the reactor parameters the position of the rods of the reactor and the state of all operable components are displayed to inform the operator of the condition or state of operation of the nuclear power plant.

The state of operation of the various components of the plant and certain fluid pressures, temperatures, and levels are connected through interlocking and logic circuitry 14 to prevent unsafe operation of selected system components and to trip or shut down the plant under abnormal conditions.

Nuclear instrumentation panel NISP is provided with various recorders, indicators, meters, and selector switches to display the neutron flux values in various sectors of the reactor, both in an axial and radial direction, which function is termed in-core flux mapping.

Also, a portion of the panel NISP displays through meters the flux in various sectors of the reactor vessel RV to inform the operator of the various ranges of nuclear flux, such as source, range, intermediate range, and power range of the reactor during start-up and shutdown, which operation is termed ex-core radiation detection. Further, the temperature of individual fuel rods of the reactor, and the radiation in various parts of the plant are monitored and displayed on the panels NISP. Finally, the auxiliary power to the plant is controlled by a portion of the panel NISP.

GENERAL DESCRIPTION OF SIMULATOR CONFIGURATION

The nuclear power plant simulator according to one embodiment of the invention comprise digital computation apparatus and peripheral equipment operatively connected to control and indication panels which are identical in appearance and wiring to the actual control and indication panels of the four loop pressurized water reactor power plant that is simulated. The general function, structure, and operation of digital computers is set forth in a publication entitled "Electronic Digital Systems" by Mr. R. K. Richards, which was published in 1966 by John Wiley and Sons, Inc. and bears the Library of Congress card catalog number 66-17618, to which reference is made for a detailed description thereof in order to aid in an understanding of the apparatus and methods in carrying out the invention.

Figure 2:
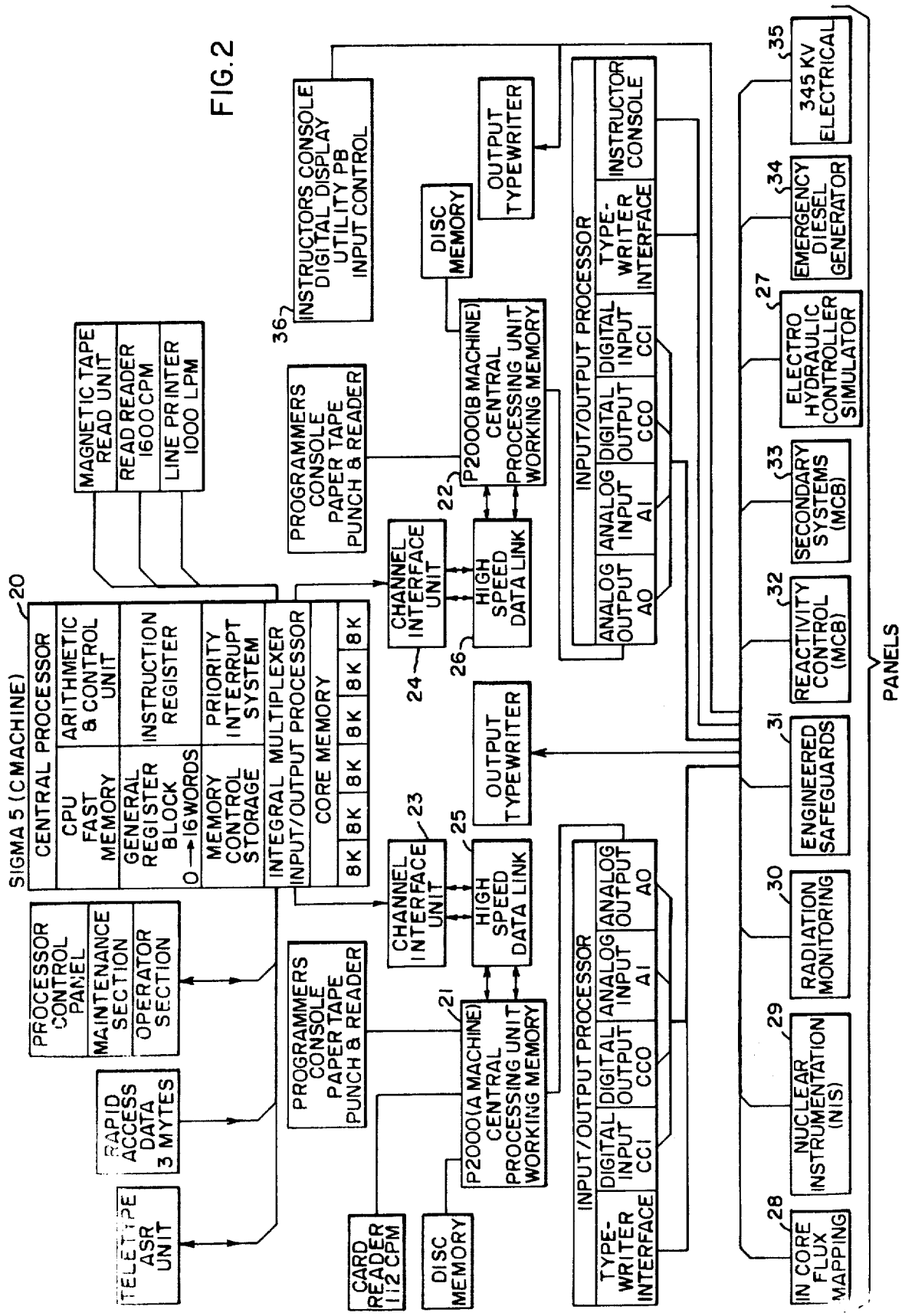
FIG. 2 shows a schematic block diagram of the apparatus used in simulating the operation of the plant shown in FIG. 1.

Specifically, and referring to FIG. 2, the simulation system includes a Sigma 5 digital computer 20 referred to at times in this specification also as the C machine and associated peripheral equipment. The Sigma 5 computer system is manufactured and sold by Xerox Data Systems, Inc. and has been in general use for over one year prior to the filing date of this application. For more information on the Sigma 5 computer system reference is made to the appendix.

The simulator also includes digital computers 21 and 22 referred to at times hereinafter also as the A machine and B machine, respectively and associated peripheral equipment of the type manufactured and sold by Westinghouse Electric Corporation, and which is known as model P2000, and which computers have been in general use for over one year prior to the filing date of this application. The P2000 digital computers 21 and 22 are described in a publication entitled "Prodac 2000 Computer Systems Reference Manual" copyrighted in 1970 by Westinghouse Electric Corporation and bears copyright Registration No. A244775, to which reference is made to aid in an understanding thereof.

The Sigma 5 computer, or C machine provides an extensive arithmetic capability for the power plant simulator. The computers 21 and 22, act as process input/output controllers for the C machine. In practicing many features of the invention, a single computer or other multiple computer arrangements may be employed.

Communication between the A, B, and C machines is provided by a combination of the Xerox Data Systems Model 7650 channel interface units 23 and 24, and high speed data link devices 25 and 26 respectively, described more fully hereinafter. The C machine provides the software control and synchronization for the multiple computer configuration involving the A machine, B machine, and C machine; and the A and B machines in addition to providing the process input/output capability for the C machine also provide a capability for instantaneous simulator responses through their external interrupt system, the processing of all interlock and protection system logic, and the processing of several employed in the simulator models, such as a reactor control rods program. The significant hardware features associated with each of the A and B machines as shown in FIG. 2 included in the appendix. The major C machine hardware subsystems illustrated in FIG. 2 and utilized in the present embodiment of the invention are also included in the appendix to this specification.

The simulation of the electrohydraulic control system EH as depicted in FIG. 1 and represented by a simulator panel portion 27 of FIG. 2 is accomplished in part by the actual analog electrohydraulic controller manufactured and sold by Westinghouse Electric Corporation, which has been in use for more than a year prior to the filing date of this application. The panels 27 through 35 in FIG. 2 provide the same outward appearance and operation as panels in an actual plant and are connected directly through appropriate computer system equipment to the A machine and the B machine.

Instructor's console 36, which provides the control facility to start, stop and manipulate the simulator is connected to software in the B machine.

A basic real time batch monitor (hereinafter referred to as RMB) software system of the C machine is a two partition system designed for normally running simultaneously foreground and background programs. The foreground programs include the system software extension programs which are made up of a sublevel processor, data link handler, and disc handler. Such foreground programs also include data conversion routines, and various dynamic models for the simulated system, which include reactor models, primary system models, secondary system models, a valve handler routine, a pump handler routine, and a controller handler routine. In order to permit an economy in core memory requirements, in the present embodiment of the invention the foreground programs and the background programs are not run at the same time.

In controlling an actual nuclear power plant of the type being simulated, the individual control devices such as selector switches, levers and pushbuttons close contacts to select certain components for operation, to energize motor operated valves, solenoids, and relays; and through a protective system of logic to select, or change the position or condition of various components for starting up, varying operation, shutting down, providing emergency measures in the event of malfunction, and testing components in subsystems of the plant. In addition, certain plant components or subsystems function in automatic control loops to which there are typically applied one or more monitored plant variables as feedback signals.

In monitoring the operation of an actual plant, temperature, pressure, flow, level, flux, and other physical measurements are detected by appropriate sensing devices which transmit such information to the control panels for operating meters, recorders, and indicators. As already indicated certain monitored variables are also used for control.

In realistically and accurately simulating the control and monitoring of a nuclear power plant in accordance with the present embodiment of the invention, such control panels together with the control and monitoring devices are an exact replica physically and operatively, of the plant being simulated. However, in simulating the system in accordance with the present embodiment, the control and monitoring devices of the control panels are wired to each other, and to turbine EH controller; and also to contact input and contact output terminals, respectively, on the A or B machines. The panel interface logic and the plant protective logic are contained in both the A and B machines as hereinbefore mentioned. The control consoles permit the student operator to control and monitor the operation of the plant in the same manner as the operator of an actual plant. For example, he can start up, increase the power, shut the plant down, and restart. At any time the instructor can change physical values or malfunction the models as previously described. Then the operator can change the operation of the plant to correct the malfunction or introduce emergency measures as required. The student is able to see realistically in real-time the consequences of any action that could be taken in the real plant.

In detailed drawings of the control panels, descriptive legends are associated with appropriate control and monitoring devices in a manner similar to an actual installation; and in addition thereto, software symbols in many instances are used to identify specific control panel devices with the same software symbol being used to identify the component being operated by such devices in the schematic diagrams of the actual system being simulated. In other instances, the actual valve number is used to the schematic diagram and the control panel where it will aid in understanding the simulation of the system.

Referring to FIG. 96/2, 22 nodes are assumed along the Z-axis which are designated G1 through G22 inclusive. G1 and G2 and G21 and G22 are assumed to be located outside the length of the fuel rods to act as neutron reflectors, which in a real reactor simulates the reflective effect of water in the reactor. At each of these nodes G1 through G22 inclusive, six delayed neutron time groups are calculated. The six time groups represent the different time fission effects of the most important delayed reaction isotopes in a nuclear reactor of the type being simulated in the present embodiment. The simulation for the one dimensional space-kinetics is mechanized in the program FCALC and begins with a steady-state eigenvalue problem solution which provides a $K_{bias}$ that is interpreted as the calculated K for measured critical of the reactor.

To obtain the three dimensional fission power distribution in the reactor core, the neutron flux distribution in the direction of the axes X-Y of FIG. 96/2 is obtained by synthesis in the models T5, 15 and 16. In the preferred embodiment of the simulator, it is assumed that the neutron flux distribution in the X and Y directions of the core are symmetrical with respect to the center of the core or Z-axis as long as there is no control rod malfunction nor xenon oscillation in the direction of the horizontal axes X-Y. In response to the introduction of a rod malfunction, the plane of the axes X-Y is tilted in the direction of the malfunctional rod, and neutron flux oscillations are caused by Xenon effects. The amount of the planar tilt as well as the amplitude of the xenon oscillations is governed by the positional asymmetry of the malfunctional rod, i.e., the differential number of steps such malfunctional rod is withdrawn or inserted, and the actual position of the malfunctional rod with respect to the center of the core.

The inputs to the programs which provide the flux synthesis include the reactor fission power and the out of position rods. The outputs of these models include the flux tilt factors for the miniature movable flux detectors previously described, the out-of-core flux detectors for the source, intermediate and power ranges, and the fixed thermocouples for the fuel assembly temperature. The programs also provide vector component addition for asymmetric flux.

EX-CORE DETECTORS (DETOUT)

Referring to FIG. 96/2, the reactor fission power is monitored in the real reactor from the source range through the intermediate range and up to 120 percent of full power output by the out-of-core or ex-core nuclear detectors. The monitor system employs eight detector assemblies located in instrument wells around the reactor. The two source range detectors have proportional counters used in the source range channel. They are located in vertical instrument wells adjacent to two opposite flat sides of the core cross-section approximately at mid-height of the core. Each of the source range wells also contains a compensated ion chamber which is used for two intermediate range detectors. The power range detectors include long ionization chambers approximately equal to the core height. In these chambers, four power range A detectors are in the upper portion of the core and four power range B detectors are adjacent the lower portion of the core; thus, providing a total of eight separate chambers or detectors, each approximately one-half the core height in length.

Referring to FIG. 90/2A, there is illustrated a portion of the control panel for a source range detector, an intermediate range detector, a power range A detector, and a power range B detector. In the actual installation being simulated there is a panel corresponding to each one of the detectors described in connection with FIG. 96/2, or a total of eight in all. For the purposes of this description only one panel for each type of detector is illustrated. Referring to FIG. 90/2B, there is illustrated the detector current comparator for the power range detectors A and B for indicating the difference between the upper section of a power range detector and the lower section of a power range detector to provide warnings of axial offset in the event of a malfunction rod for example. Also in FIG. 90/2B is shown the audio portion of the panel which provides audio signals of the neutron flux, the rate of which corresponds to the amount of flux in the reactor.

Figure 92G:
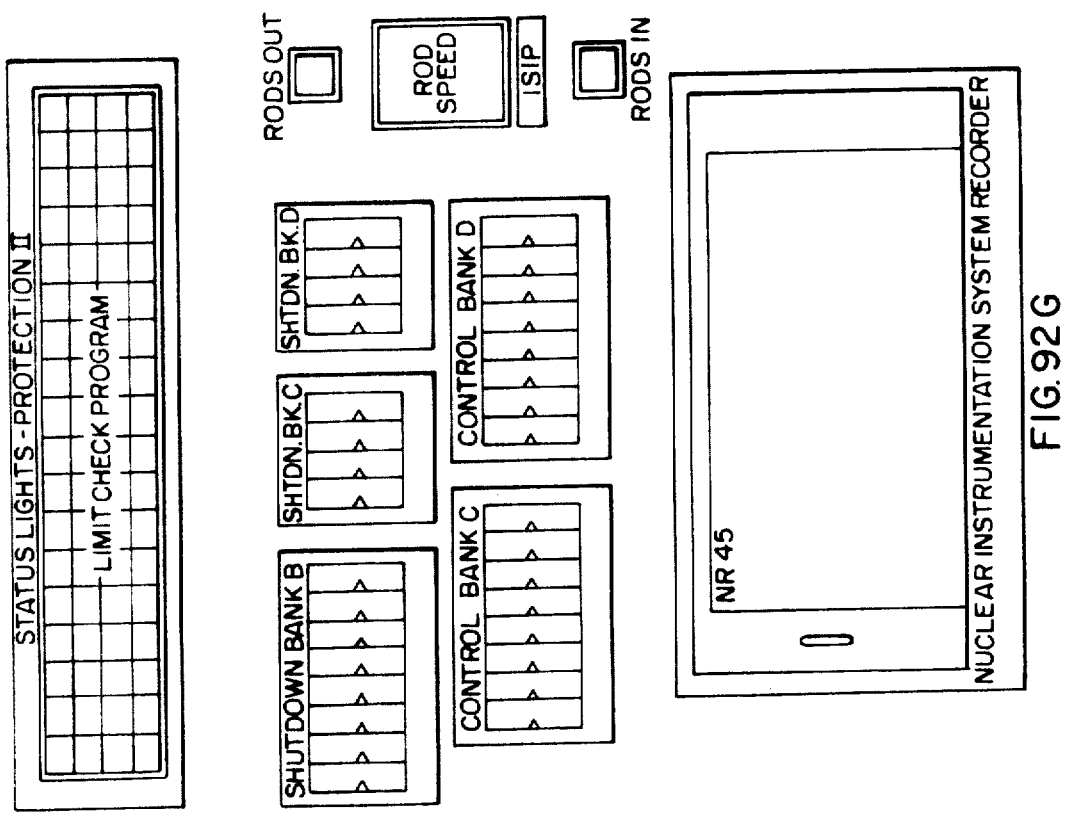

Referring to the control panel of FIG. 92I, the meter SOUR indicate the count rate of the source range detectors. The meters YRSUR indicate the startup rate of the two source range detectors. The meters SRSUR indicate the startup rate of the intermediate range detectors and the meters YNTER indicate the current which is representative of the amount of flux in the intermediate range detectors. The meters OFFSET and the meters TPOW represent the power range detectors and indicate the axial offset between the top and bottom power range detectors A and power range detectors B, respectively to guide the operator in positioning the part length rods. Also, the recorder PRTOP records a current in the ion chamber for each one of the top or power range detectors A and the recorders PRB record the ion chamber current for the bottom or power range detectors B. The panel illustrated in FIG. 92G has a recorder NR45 which records overtime the flux of the source range detectors in the simulator. The recorders are wired directly to the meters so that they follow the indication on the meters.

The ex-core detectors are simulated in the model T3 by the program DETOUT. This simulation calculates the flux in the ion chambers for the source range, intermediate range and power range from the flux shape, and the time-in-life of the fuel rods. The source range randomizing for the meters and the audio output is included. Also, the malfunction of nuclear instruments is included in this routine. The inputs to this routine DETOUT include the reactor flux shape, and the status of the control power contacts HV (see FIG. 90/2A) for each of the detectors. Also, the range switch, operation selection, for the source range and intermediate range detectors are input to the program. The outputs of the program DETOUT are coupled to the nuclear meters on the control panel in FIG. 92I, the meters on the control panel shown in FIG. 90/2A and the audio count rate position illustrated in FIG. 90/2B.

Each of the power range detectors represents spatial flux power for one octant of the reactor core. The output of the X-Y synthesis model is applied to each quandrant of the core. The average flux for each of the power range detectors A and B respectively is calculated for its particular octant with an overlap in a vertical direction of 10 percent of the top detector reading coming from the bottom of the core and 10 percent of the bottom of the core going to the top of the core. The conversion is made from the flux to the meter output by normalizing at full power for each instrument range at each point in fuel rod life.

The source range and intermediate range kinetics are calculated for each point G (see FIG. 96/2) in the previously described space-time kinetics model T8. The axial flux distribution is calculated from the X-Y synthesis simulation, and the small source term now becomes dominant. The radical (X-Y) flux tilt from the previously described X-Y synthesis simulation is multiplied by the intermediate range detector readings; and a small constant difference is applied between the two detectors in each of the intermediate and source ranges to provide realism.

In the source range, stochastic variations in the count rate are prominent, both on the visual meters or indicators and the audio count rate meter. In order to provide absolute realism in both the visual and audio meters, it is necessary in the source range that the power output be randomized. Otherwise, there will be a sequence or rhythm to such pulses thus indicating to the student that such readings differ from the actual nuclear instrumentation system. The simulation of the output to the audio and visual meters from the source range detector is a hybrid arrangement whereby an average count output rate from the model is an input to a randomizing hardware device external to the computer that produces a random output pulse train varying according to the average input. The startup rate meters SRSUR and YRSUR are calculated as the log of the output at the present time step divided by the output at the previous time step. Because of the rapid variation in source level between subsequent time steps, a twelve second filter is used on the source range SRSUR.

The reciprocal of the source range nuclear power level, which is calculated in the subroutine DETOUT, is scaled for input to the randomizing count rate equipment. The input data for the count rate equipment is transmitted from the sigma 5 computer via the high speed data link to the P2000A computer where the bit pattern for the scaled 16 bit number is used to set up 16 corresponding contact outputs, which outputs are updated four times per second.

Referring to FIGS. 96/29, sixteen contact outputs 101 at corresponding bits of the input buffer portion 102 of the count rate driver 100. The number being input to the buffer 102 is then transferred through gating circuits 103 to a sixteen bit down counter 104. Clock pulses from a 2 megahertz oscillator 105 count the number stored in the counter 104 down to zero. An output pulse is generated at B upon reaching zero. The counter 104 is then reloaded from the buffer 102 and the cycle repeats. Thus, the pulse rate out of the down counter 104 is inversely proportional to the number stored or transferred from the buffer 102. Since the number transferred from the buffer 102 is the reciprocal of the source range power level, the pulse rate on B is directly proportional to the source range power level.

The random timing variations which simulate the random characteristics typical of a reactor at low power are inserted by a second set of counters. A four-bit recycle counter 106 counts in a binary count in sequence in the order shown on the drawing of FIG. 96/29. An oscillator 107 drives the counter at 10 megahertz and the random count from the counter 106 is periodically transferred through a gating circuit 107 to a five-bit down counter 108. In the counter 108, the random binary number is counted to zero by the pulses that are output at B from the down counter 104. Each time Thus, the final output pulses at C are, on a long term average, proportional to the simulated neutron power level, but any given pulse varies in time in a random fashion due to both the random count pattern of the counter 106 and the fact that the driving oscillators 105 and 107 are not correlated.

To completely simulate the nuclear power plant operation at zero power and during startup, it is necessary to drive the nuclear instrumentation system source range with pseudo random pulses representing neutron radiation ranging in count from 10 to $10^5$ cycles per second. In the sigma 5 computer 100 random numbers are provided to vary the power level and convert it to 16-bits for application to the buffer 102. Thus, each quarter of a second the input number or control word is randomized slightly to provide further random characteristics that are input to the counter 100.

With detailed reference to FIG. 96/30, a timing graph is shown that illustrates output pulses at a slow rate in a random fashion. For example, with an input control word of fifty the time between the first two pulses as shown on the graph is approximately 0.62½ seconds, the time between the second pulse and the third pulse is approximately 0.125 seconds and the time between the third pulse and the fourth pulse is approximately 0.38 seconds. When the control word or input value changes to 25 for example, the time between the last described pulse and the fifth pulse is approximately 0.625 seconds and the time between the fifth pulse and the six pulse is approximately 0.19 seconds. Thus, from an inspection of the graph it can be seen that the random characteristics exist between output pulses even though the repetition rate within a certain time period increases or decreases. The average output of the counter 108 ranges from four cycles to 131 kilocycles with pseudo randomness varying from 2.3 pulses per second to 509 kilocycles per second.

It is understood that the various inventive features in the improved method and simulation system, may be implemented in either an analog, digital, or analog/digital with or without single or multiple computer apparatus. Also many of the features are applicable in the simulation of other pressurized water reactor plant arrangements, boiling water reactor plants, and gas and other nuclear plant arrangements.

Reference is made to U.S. Pat. application bearing Ser. No. 333,901 entitled "Training Simulator For A Nuclear Power Plant" and filed by G. L. Gregg, R. E. Putman and J. W. Gomola which is assigned to the present assignee and filed concurrently herewith; and which is incorporated herein by reference and made a part hereof.

We claim:

1. A system for simulating the real-time operation of a nuclear power plant that includes a simulated nuclear reactor controlled to selected power levels, comprising,
    a plurality of manually operable devices to provide input signals related to the operation of a simulated reactor control mechanism,
    means to generate a physical value relating to the power level of a nuclear reactor in accordance with the input signals,
    first counting means responsive to the generated physical value for producing an output pulse at successive time intervals related to the physical value,
    second counting means driven by the output pulses of the first counting means to produce an output pulse upon the counting of each of successive trains of differing numbers of pulses, and indicating means responsive to each of the output pulses from the second counting means.

2. A system according to claim 1 wherein the successive trains of differing pulse numbers are produced by third counting means driven by an oscillating means.

3. A system according to claim 2 wherein the still other counting means is a polynomial counter.

4. A system according to claim 2 where the first counting means is driven by an oscillator.

5. A system according to claim 4 wherein the frequency of the first counting means is less than the frequency of the third counting means.

6. A system according to claim 1 wherein the means to generate the physical value includes a programmed digital computer.

7. A system for simulating the real-time operation of a nuclear power plant having a simulated nuclear reactor controlled to selected power levels, comprising,
    a plurality of manually operable devices to provide input signals related to the simulated operation of a reactor control system,
    means to generate a physical value relating to the power level of a nuclear reactor in accordance with the input signals,
    a first counting means controlled by an oscillating means of a predetermined frequency to produce an output signal upon the counting of a predetermined number of electrical signals determined by the generated physical value,
    a second counting means controlled by an oscillating means of a predetermined frequency to produce successively a different number of random count signals,
    a third counting means controlled by the output signals from the first counting means to produce an output signal upon the counting of each of the successive random count signals, and indicating means responsive to each of the output signals of the third counting means to produce an audible signal upon the occurrence of each of the output signals.

8. A system according to claim 7 wherein the means to generate the physical value is a programmed digital computer.

9. A method of simulating the real-time operation of a nuclear power plant wherein a simulated nuclear reactor is controlled to selected power levels that includes, a plurality of manually operable devices to provide input signals related to the operation of a simulated reactor control mechanism comprising, generating a physical value relating to the power level of a simulated nuclear reactor in accordance with the input signals, generating a first output signal at time intervals related to the generated physical value, generating a second output signal at successively different time intervals in response to the first output signal, and operating an indicating means in response to the second output signal to monitor the simulated nuclear fission rate.

10. A method of simulating the real-time operation of a nuclear power plant having a simulated nuclear reactor controlled to selected power levels, utilizing apparatus wherein a plurality of manually operable devices provide input signals related to the simulated operation of a reactor control system and wherein a plurality of indicating devices respond to output signals for indicating the rate of nuclear fission, comprising generating a physical value relating to the power level of the nuclear reactor in accordance with the input signals, counting at a predetermined frequency a discrete number in accordance with the generated physical value to produce a first output signal upon the completion of each discrete count, counting at a predetermined frequency different numbers in succession, counting at a frequency governed by the different successive numbers to produce a second output signal upon the completion of each successively different number of counts, and operating the indicating means in response to each of the second output signals to produce a signal upon the occurrence of each of the second output signals.

11. A method according to claim 10 wherein the step of generating the physical value is accomplished by means including a programmed digital computer.

* * * * *